US009326202B2

(12) United States Patent
Barbaresi et al.

(10) Patent No.: US 9,326,202 B2
(45) Date of Patent: Apr. 26, 2016

(54) METHOD AND SYSTEM FOR THE COMMON MANAGEMENT OF COMMUNICATION RESOURCES IN A TELECOMMUNICATIONS NETWORK HAVING DISTINCT COMMUNICATION RESOURCES POOLS

(75) Inventors: Andrea Barbaresi, Turin (IT); Paolo Goria, Turin (IT); Marco Tosalli, Turin (IT)

(73) Assignee: Telecom Italia S.p.A., Milan (IT)

( * ) Notice: Subject to any disclaimer, the term of this patent is extended or adjusted under 35 U.S.C. 154(b) by 603 days.

(21) Appl. No.: 12/992,241

(22) PCT Filed: May 12, 2008

(86) PCT No.: PCT/EP2008/055793
§ 371 (c)(1),
(2), (4) Date: Nov. 11, 2010

(87) PCT Pub. No.: WO2009/138118
PCT Pub. Date: Nov. 19, 2009

(65) Prior Publication Data
US 2011/0082937 A1 Apr. 7, 2011

(51) Int. Cl.
*H04W 36/14* (2009.01)
*H04W 28/08* (2009.01)
(Continued)

(52) U.S. Cl.
CPC .............. *H04W 36/14* (2013.01); *H04W 28/08* (2013.01); *H04W 36/0083* (2013.01); *H04W 36/22* (2013.01); *H04W 48/18* (2013.01)

(58) Field of Classification Search
CPC . H04W 72/04; H04W 72/0406; H04W 72/10; H04W 72/1215; H04W 72/1242; H04W 72/1226
USPC ......... 370/229, 230, 232, 235, 236, 254–255, 370/328–331, 437; 709/224–226, 229, 235
See application file for complete search history.

(56) References Cited

U.S. PATENT DOCUMENTS 6,493,555 B2 * 12/2002 Saada et al. ................... 455/438
6,591,103 B1 7/2003 Dunn et al.
(Continued)

FOREIGN PATENT DOCUMENTS

CA 2593314 A1 7/2006
EP 1383262 A1 1/2004
(Continued)

OTHER PUBLICATIONS

IBM Technical Disclosure Bulletin, "Dynamic Adjustment of Timer to Terminate Multicast Queries", Jun. 1992, US, NB9206400 p. 400-401.*

(Continued)

*Primary Examiner* — Joseph Bednash
(74) *Attorney, Agent, or Firm* — Banner & Witcoff, Ltd.

(57) ABSTRACT

A method of providing, in a telecommunications network including at least a first and a second set of communication resources, a service to users in a condition of being provided said service both by the first set of communication resources and by the second set of communication resources. The method includes the steps of: upon receipt, through the first set of communication resources, of a service request related to the service from a user, attempting to redirect the service request to the second set of communication resources, and if the attempt succeeds, provisioning the service to the user by the second set of communication resources. The attempt to redirect the service request includes identifying a communication resource among the second set of communication resources, by either considering or not communication resources of the second set as candidates for the service request redirection based on a history criterion that takes into account an observation of the outcome of past redirection attempts.

20 Claims, 5 Drawing Sheets

(51) Int. Cl.
*H04W 36/22* (2009.01)
*H04W 48/18* (2009.01)
*H04W 36/00* (2009.01)

(56) References Cited

U.S. PATENT DOCUMENTS

| | | | |
|---|---|---|---|
| 6,944,144 B2 | 9/2005 | Guo et al. | |
| 6,963,745 B2 | 11/2005 | Singh et al. | |
| 7,415,279 B2* | 8/2008 | Liang | 455/450 |
| 7,441,026 B2* | 10/2008 | Prabhakar et al. | 709/224 |
| 8,369,272 B2* | 2/2013 | Barbaresi et al. | 370/329 |
| 8,428,014 B2* | 4/2013 | Cave et al. | 370/329 |
| 2002/0164985 A1* | 11/2002 | Saada et al. | 455/436 |
| 2004/0252666 A1* | 12/2004 | Johnson | 370/335 |
| 2005/0090257 A1 | 4/2005 | Kroener et al. | |
| 2010/0029290 A1* | 2/2010 | Barbaresi et al. | 455/450 |
| 2010/0037284 A1* | 2/2010 | Sachs | 726/1 |

FOREIGN PATENT DOCUMENTS

| | | |
|---|---|---|
| EP | 1519607 A1 | 3/2005 |
| EP | 1655986 | 5/2006 |
| WO | 98/32262 | 7/1998 |
| WO | 00/35226 A1 | 6/2000 |
| WO | 03/069938 A1 | 8/2003 |
| WO | 2005/101880 | 10/2005 |

OTHER PUBLICATIONS

International Search Report and Written Opinion mailed Mar. 6, 2009, PCT/EP2008/055793.
"Digital Cellular Telecommunications System (Phase 2+); Universal Mobile Telecommunications system (UMTS); Handover procedures (3GPP TS 23.009 version 7.0.0 Release 7); ETSI TS 123 009" ETSI Standards, LIS, Sophia Antipolis Cedex, FR, vol. 3-CN1, No. v7.0.0, Mar. 1, 2007, XP014037694.

* cited by examiner

METHOD AND SYSTEM FOR THE COMMON MANAGEMENT OF COMMUNICATION RESOURCES IN A TELECOMMUNICATIONS NETWORK HAVING DISTINCT COMMUNICATION RESOURCES POOLS

CROSS REFERENCE TO RELATED APPLICATIONS

This is a U.S. National Phase Application under 35 U.S.C. §371 of International Application No. PCT/EP2008/055793, filed May 12, 2008, which was published Under PCT Article 21(2), the entire contents of which are incorporated herein by reference.

BACKGROUND OF THE INVENTION

1. Field of the Invention

The present invention generally relates to telecommunication networks and, more specifically, it pertains to methods for communication resource management in such networks. More particularly, the present invention relates to a method and system for the common management of communication resources in telecommunication networks having several (at least two) distinct communication resources pools.

2. Description of the Related Art

In radio communication networks, Radio Resource Management (RRM) methods are performed during normal system operation within network apparatuses that manage and control the radio resources of the cells included in a radio telecommunications network.

Among RRM methods, Common Radio Resource Management (CRRM) methods take into account the possibility of jointly managing radio resources in a "heterogeneous" cellular radio mobile network.

A heterogeneous cellular network includes different radio access technologies and is generally of the "multiple-access" type, meaning that the part of the network providing access to the network transport segment is implemented by two or more systems conforming to different standards.

Several radio mobile cellular system standards already exist nowadays. The so-called "second generation" or "2G" systems, like for instance the GSM system, and "third generation" or 3G systems, including e.g. the UMTS, which are still the most broadly diffused, will be increasingly operated in combination with newly deployed systems, in particular designed to offer wide-band access, such as for example E-UTRAN (Evolved UMTS Terrestrial Radio Access Network), WiMAX and future IMT-Advanced (International Mobile Telecommunication) systems (still on their way of definition).

Second-generation cellular networks are mostly adapted to provide voice services, while third-generation and fourth-generation networks are intended to support, in addition to voice services, a wide variety of new data and multimedia services. It is generally expected that, at least for some years, the newly deployed cellular networks will not completely substitute the existing, second- and third-generation networks. They will rather integrate existing networks by offering to customers the possibility of using new types of services in addition to the standard voice service. Integration is made possible by the characteristics of the new standards, which have been defined in such a way as to permit operation in a joint and synergic manner with existing cellular networks, and to offer a wide variety of services to user owning multi-mode terminals (cellular phones, palmtops, Personal Digital Assistants—PDAs—, network interface cards for Personal Computers—PCs, and similar devices).

A heterogeneous network is a network including, for instance, both the radio access segment of a GSM (General System for Mobile communications) system and the radio access segment of a UMTS (Universal Mobile Telecommunication System) system, as well as, possibly, additional radio access segments of different standards.

Some of the CRRM solutions known in the art operate in such a way that users are moved from one radio access system to another when the service is already being provided. Methods of this type are for example disclosed in US2005/90257, U.S. Pat. No. 6,944,144, U.S. Pat. No. 6,963,745, WO 2000/35226 and WO 2003/069938.

Other solutions have been proposed which start acting at the service request. Most of the solutions of this type however are limited to the transfer of users from a system to another only when the currently used system is close to congestion; these CRRM algorithms are "congestion-prevention" oriented.

As a general solution known in the art, EP 1519607 discloses a method and system for performing radio resource management in a mobile radio network based on exchanging load information among different network entities (CN, RNC/BSC, Node B/BTS, CRRM server) in a mobile radio network. The solution is characterized in that user equipment information and/or subscriber related information and/or radio cell status information from different network entities are transmitted to a Common Radio Resource Management entity; said pieces of information are used in said Common Radio Resource Management entity for deciding on the most suitable network access.

A further solution is disclosed in CA 2593314 that describes in a multi-access system, an access selection principle achieved by selecting a signal strength threshold level based on a determined load level in a first access network. A new user in an area commonly covered by more than one access network attempts to allocate to the first access network if an experienced signal strength exceeds the signal strength threshold level. Communication utility can preferably be maximised or at least be taken into account by using suitable load level dependencies. By increasing the threshold when the load level approaches the capacity limit, a completely filled first access network is avoided. This gives an opportunity to let particularly well-suited users still have access to the first access network. At the same time, since the preferred access is decided before the actual access attempt, control signalling can be significantly reduced, even at very high traffic loads.

WO 2005/101880, in the name of the present Applicant, discloses a method for providing, in a communication network including at least a first (e.g. GSM) and a second (e.g. UMTS) set of resources, a service to users of at least a first and a second type. The users of the first type are in a condition to be provided said service only by said first set of resources, while the users of said second type are in a condition to be provided said service both by said first set of resources and by said second set of resources. The method includes the steps of: detecting during at least one time interval, the total number of requests for service coming from said users, identifying within the total number the fraction of requests adapted to be met only by said first set of resources, identifying at least one parameter representative of said fraction, and providing the service to said users of said second type by said second set of resources as a function of said at least one parameter.

SUMMARY OF THE INVENTION

The Applicant has observed that an approach in which users are moved from a first radio access system to a second one only when the requested network service is already being provided requires that the service request is accepted on the first system, and only thereafter it can be moved onto a different system, with the possibility of worsening an already critical load status of the first system.

Those solutions which are limited to the transfer of users from a system to another only when the currently used system is close to congestion, i.e. "congestion-prevention" oriented CRRM algorithms, are designed to avoid critical conditions, but are not suitable for achieving a distribution of the traffic over the different radio access systems according to a predefined profile and permanently in the time, with the aim of optimizing the network performance in normal operating conditions.

Concerning the solution disclosed in WO 2005/101880, the Applicant observes that it uses a threshold of active users on the target system (first set of resources), and adapts such threshold based on a fraction of the service requests that can indifferently exploit the first and second sets of resources. As a result of that, this solution requires to know the current load of all the supported systems (supported sets of resources) in order to decide how to manage the incoming call. To this purpose, adaptation of the network controllers responsible of both the sets of resources are needed to implement the solution, a thing that in some circumstances may be viewed as undesirable.

In view of the state of the art outlined in the foregoing, the Applicant has tackled the problem of providing an improved common radio resource management method and system overcoming the drawbacks of the known solutions.

The Applicant has devised a solution according to which, upon receiving, at a source system (including a first set of communication resources) of a telecommunications network, a new service request by a user, attempts redirecting the service request to a desired target system (including a second set of communication resources, distinct, physically or logically, or treated distinctly from the first set of communication resources) of the telecommunications network, and the attempt is made irrespective of the current state of the target system. The choice of which communication resource(s) in the target system select for the redirection attempt is made based on an observation, by the source system, of past redirection attempts, particularly the observation of whether the past redirection attempts were successful or not.

In this way, the proposed method is able to take optimized decisions according to the observable feedbacks received from the target system (in terms of the past redirection attempts success or failure), without the need for the source system to have a direct knowledge of the status (e.g, load status of the communication resources) of the target system. Implementation of the solution is thus greatly simplified, because adaptations of the communication resources controllers are very limited, and in particular they may be limited to only the controller of the source system, leaving the target system(s) essentially unmodified.

Preferably, but not limitatively, the redirection attempt is made before setting up the service provisioning to the user, in this way avoiding the possibility of worsening an already critical load status of the source system.

An aspect of the present invention relates to a method of providing, in a telecommunications network including at least a first and a second set of communication resources, a service to users in a condition of being provided said service both by said first set of communication resources and by said second set of communication resources, the method including the steps of:

upon receipt, through said first set of communication resources, of a service request related to said service from a user, attempting redirecting the service request to the second set of communication resources; and if the attempt succeeds, provisioning the service to the user by said second set of communication resources, wherein said attempting redirecting the service request includes identifying a communication resource among said second set of communication resources, and said identifying a communication resource includes either considering or not communication resources of the second set as candidates for the service request redirection based on a history criterion that takes into account an observation of the outcome of past redirection attempts.

For the purposes of the present invention, by "communication resources" it is meant any possible type of resources that are used in telecommunication network for providing services to users, in particular, but not limitatively:

radio resources of a radio communications network belonging to different radio access technologies;

radio resources of a radio communications network using different radio frequencies;

cells of cellular networks belonging to different hierarchical levels;

radio resources of a radio communications network having a different radio resources control management (e.g. dedicated channels versus shared channels);

radio resources of a radio communications network corresponding to different and partially overlapped radio coverage areas obtainable by different beams of the same antenna or different antennas;

different logical transport links, also in a fixed (wired) telecommunication network.

The step of identifying a communication resource among said second set of communication resources may in particular comprise not considering communication resources of the second set in respect of which a previous attempt of redirecting a service request thereto failed.

The attempt to redirect the service request may be conditioned to one or more predefined criteria, for example including one or more among:

assessing a type of the requested service;

assessing a load status of the first set of communication resources;

attempting redirecting the service request for every service request received after a predefined number of previous service requests.

Preferably, communication resources in the second set are not considered limitedly to a time interval, which in particular may either be fixed or dynamically variable, for example varied dynamically based on successes and failures of previous redirection attempts. In particular, said time interval may be decreased when a redirection attempts succeeds, preferably not below a minimum value, and it may be increased when a redirection attempt fails, preferably not above a maximum value.

The identified communication resource among said second set of communication resources may accept or refuse the redirection attempt based for example on a current load status thereof.

In embodiments of the present invention, said first set of communication resources and second set of communication resources include cells of a cellular network, and said identifying a communication resource among said second set of communication resources comprises selecting cellular network cells in the second set of communication resources that are in overlap (i.e. that at least partially cover the same area) with the cellular network cells of the first set of communication resources.

In embodiments wherein said second set of communication resources includes radio communication resources, said step of identifying a communication resource among said second set of communication resources may comprise performing measurements on the radio quality of the communication resources of the second set, and not considering communications resources of the second set having a measured radio quality below a predetermined level.

Preferably, the attempt to redirect the service request to the second set of communication resources is performed before starting provisioning the service to the user.

According to another aspect of the present invention, there is provided a communications resources controller for a telecommunications network including at least a first and a second set of communication resources and adapted to provide a service to users in a condition of being provided said service both by said first set of communication resources and by said second set of communication resources, the communications resources controller comprising:

a service request redirection module, operable to attempt redirecting a service request, related to said service, to the second set of communication resources upon receipt, through said first set of communication resources, of the service request from a user, so that if the attempt succeeds, the service is provisioned to the user by said second set of communication resources, wherein said service request redirection module includes a communication resources identification module operable to identify a communication resource among said second set of communication resources, said communication resources identification module being operable to either consider or not communication resources of the second set as candidates for the service request redirection based on a history criterion that takes into account an observation of the outcome of past redirection attempts.

According to still another aspect of the present invention, a telecommunications network is provided including at least a first and a second set of communication resources and adapted to provide a service to users in a condition of being provided said service both by said first set of communication resources and by said second set of communication resources, the telecommunications network comprising a communications resources controller according to previous aspect.

The present invention also relates to a computer program product loadable in the memory of at least one programmable data processing apparatus or system, e.g. computer, and including software code portions for performing the method of the first mentioned aspect of the invention.

The solution according to the present invention may for example be exploited for concentrating traffic of a certain nature, e.g. voice calls, onto communications resources of a certain pool, e.g. GSM radio resources, reserving different communication resources pools, like UMTS radio resources, to traffic of different nature, e.g. data transfer, Internet access, multimedia services.

Attempting to redirect incoming service requests from a source system to a desired target system upon their arrival may be beneficial in those cases where the source system receiving the service request is in critical condition, e.g. overloaded or congested: if the redirection attempt is successful, the provisioning of the service is activated from the very beginning on the target system, without further worsening the state of the source system.

Using the solution according to the present invention, it is possible to set up policies that allow a distribution of the traffic according to a desired profile defined by the network operator, and in a way which is stable over time, not only when the network is in critical, congested conditions.

Unlike other solutions which require specific modifications and additional features on every systems (source and target), the implementation of the solution according to the present invention is simpler, being for example possible to implement it in the source system only, by exploiting the already existing interworking mechanisms between network apparatus, without the need of modifying the network, at least from the hardware viewpoint.

BRIEF DESCRIPTION OF THE DRAWINGS

These and other features and advantages of the present invention will be made apparent by the following detailed description of some embodiments thereof, provided merely by way of non-limitative example, by referring to the attached drawings, wherein.

DETAILED DESCRIPTION OF EMBODIMENTS OF THE INVENTION

Figure 1:
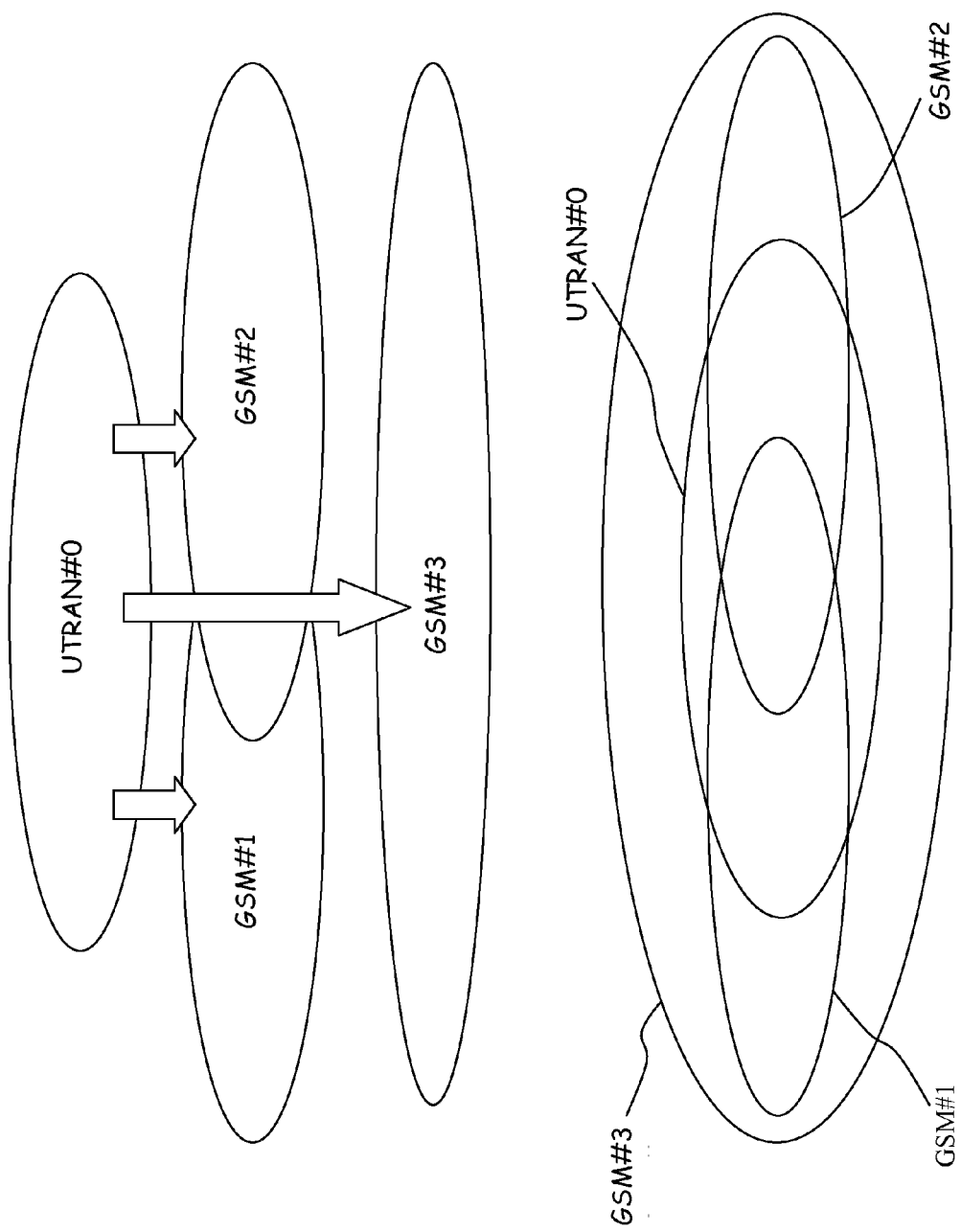
FIG. 1 schematically shows an exemplary situation of overlay of cells of a heterogeneous radio mobile cellular network.

In the following, an exemplary embodiment of the present invention will be described which is applicable to a heterogeneous mobile radio network having a multi-standard radio access segment comprised of two RANs, particularly a 2G RAN and a 3G RAN, even more particularly the GSM/EDGE RAN (GSM EDGE RAN—GERAN) and the UMTS Terrestrial RAN (UTRAN).

It will also be assumed, by way of example, that the network is configured in such a way that dual-mode GSM/UMTS mobile communication terminals are driven to camp on the 3G RAN when in idle mode, i.e. when no service is being delivered; this means that, considering an area fully covered by both the GSM and the UMTS RANs, and taking for example into consideration voice calls, service requests from users equipped with dual-mode mobile terminals are firstly received at the competent radio controller of the 3G network (i.e. at the UMTS RNC).

Under these assumptions, which are however not limitative for the present invention, the CRRM algorithm implementing the CRRM method according to the described invention embodiment manages the service requests received at the RNC, and ascertains whether it is possible and convenient to transfer part of such service requests onto the 2G network, as described in detail in the following.

It is pointed out that the scenario considered herein for the purposes of explanation of the invention is merely exemplary and does not preclude the application of the invention to different contexts, as will be discussed later. More generally, the present invention allows distributing over two or more different radio access systems traffic deriving from each service type, for example concentrating traffic related to a certain service on one of the available access systems to the telecommunications network, so as to improve the overall radio resources exploitation for supporting the total traffic deriving from the different services offered by the network.

According to the exemplary embodiment considered herein, the CRRM algorithm ascertains whether the conditions exist for redirecting a service request related to a voice call arrived at a network cell of the 3G system (hereinafter also referred to as the "source system"), by selecting a network cell of the 2G system (hereinafter also referred to as the "target system"), wherein the 2G network cell is in overlay, i.e. in overlap with, i.e. vertically adjacent to the 3G network cell.

As known in the art, a cell of a cellular network is a geographic area portion covered by the signal irradiated by one antenna or one antenna array belonging to a base radio station of the network (e.g., a Base Transceiver Station— BTS—of a GERAN, or a NodeB of a UTRAN), which is denoted as the best-server base radio station in that geographic area portion.

For each 3G network cell, a list $E_0$ is provided of the 2G network cells in overlap therewith which are potentially capable of receiving traffic redirected from the source system; the list $E_0$ may be configured by the network manager, and is preferably sorted in decreasing order of a desired preference criterion, that can be defined by the network manager.

For example, referring to FIG. 1, reference numeral UTRAN#0 denotes a cell of the 3G RAN, particularly the UTRAN; reference numerals GSM#1, GSM#2 and GSM#3 denote three cells of the 2G RAN, particularly the GERAN. The UTRAN cell UTRAN#0 is in partial overlap with the three GERAN cells GSM#1, GSM#2 and GSM#3. The list $E_0$ for the UTRAN cell UTRAN#0 includes the three GERAN cells GSM#1, GSM#2 and GSM#3, for example in the following order: $E_0=\{GSM\#3, GSM\#1, GSM\#2\}$, so that the GERAN cell GSM#3 is specified as the preferred one, to be considered first when trying to redirect traffic from the UTRAN cell UTRAN#0, while the GERAN cells GSM#1 and GSM#2 are to be considered as a second and third alternatives, respectively. This configuration may for example reflect the fact that the GERAN cell GSM#3 is in overlap with the major part of the area covered by the UTRAN cell UTRAN#0, whereas the GERAN cells GSM#1 and GSM#2 overlap the area covered by the UTRAN cell UTRAN#0 to a lesser extent, as depicted in the second part of FIG. 1. Other possible criteria may however be followed to compile the list $E_0$ of cells in overlap (for example, in the considered scenario the network manager might include in the list $E_0$ only the GERAN cell GSM#3).

Figure 2:
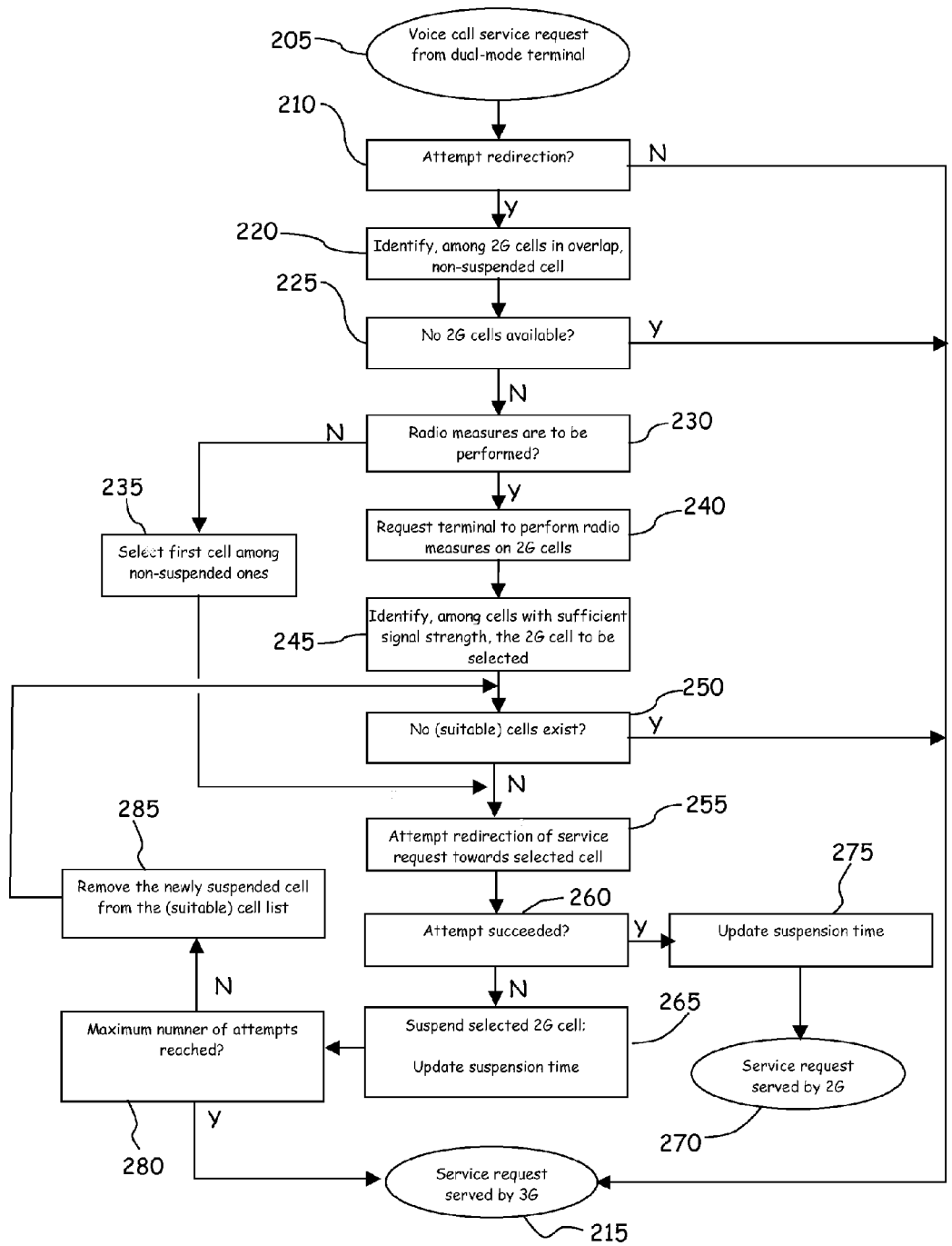
FIG. 2 is a schematic flowchart depicting the main steps of a method according to an embodiment of the present invention.

FIG. 2 schematically shows, in terms of a flowchart, the main steps of a method according to an embodiment of the present invention, applied to the herein considered scenario.

Upon arrival at the 3G network of a service request related to a voice call made by a dual-mode terminal camped for example on the UTRAN cell UTRAN#0 (block 205), the CRRM algorithm may evaluate the possibility of redirecting the service request onto the 2G network (block 210).

For example, the assessment of the service request redirection possibility may be based on the load status of the 3G cell. The load status assessment may for example be made comparing the load L of the 3G cell to a threshold $L^{3G}_{LOW}$: if $L<L^{3G}_{LOW}$ the CRRM algorithm may decide not to attempt the service request redirection, otherwise it decides to attempt the redirection. Conditioning the service request redirection from the 3G cell to a 2G cell to a criterion, for example based on the source system load condition, may for example be useful to avoid that the procedures for the service request redirection are entered when the traffic is low, i.e. the 3G cell is more or less far away from the critical conditions.

Alternatively, or in combination, the attempt to redirect the service request may be made for every service request received after a predetermined number of preceding service requests (where the predetermined number may be an input parameter to the CRRM algorithm, provided in the configuration phase of the CRRM algorithm); in this way, the processing load of the radio controller implementing the CRRM algorithm may be reduced, as well as the network signalling load required to redirect each call.

Other criteria may be implemented for deciding whether or not to attempt the service request redirection. It is however pointed out that the step of conditioning the service request redirection attempt to the occurrence of one or more conditions is not mandatory and merely optional.

If the radio controller decides not to attempt the service request redirection (exit branch N of block 210), the service request is served by the 3G network (block 215).

Otherwise (exit branch Y of block 210), the algorithm enters a phase of identification of a suitable cell of the target system (i.e., of a 2G cell).

To this purpose, the list $E_0$ of 2G cells in overlap with the UTRAN cell UTRAN#0 is considered; referring to the above considered example, $E_0=\{GSM\#3, GSM\#1, GSM\#2\}$. From this list, the 2G cells that are in a "suspended" state are discarded. A cell is for example "suspended" if, for any reason, it has previously refused one or more service request redirection attempts; exemplary causes of denial of a service request redirection are discussed hereinafter. Suspension of a cell may also be due to other causes, not necessarily related to the denial or refusal of previous redirection attempts. A cell may be kept suspended for a certain time interval, as described in detail later.

Only the 2G cells in the list $E_0$ related to the UTRAN cell UTRAN#0 that are not in a suspended condition are retained (block 220).

Let $E_1$ denote the list of 2G cells in overlap with the UTRAN cell UTRAN#0 which are not currently in a suspended state; in the list $E_1$ the cells are listed according to the preference order defined above, for example let it be assumed that the 2G cell GSM#3 is currently suspended: $E_1=\{GSM\#1, GSM\#2\}$. If the list $E_1$ is void, i.e. all the cells in overlap with the UTRAN cell UTRAN#0 are at that moment in a suspended state, no 2G cells are available for the service request redirection (block 225, exit branch Y). The service request is thus assigned to the 3G network (block 215).

Otherwise, if the list $E_1$ is not void (block 225, exit branch N), the method proceeds with the following steps.

The method may provide that radio measurements are made on the signals irradiated by the 2G cells in the list $E_1$. This feature may for example be set in the configuration phase.

In the negative case, i.e. if in the algorithm configuration phase it has been specified that no radio measurements are to be performed (exit branch N of block 230), the first 2G cell in the list $E_1$ is selected (block 235).

Otherwise, if radio measurements are to be performed (exit branch Y of block 230), a list of cells $E_2$ is extracted from the list $E_1$ (preferably keeping the preference order specified by the network manager for $E_0$) including those cells on which the radio measurements are to be performed. For example, the list $E_2$ may include the first cells of the list $E_1$, up to a maximum number N of cells, for example specified in the algorithm configuration phase. It has to be noted that nothing prevents from performing radio measurements in respect of all the cells in the list $E_1$, however limiting the number of cells on which to perform radio measurements may reduce the time needed to the communications terminal for performing the measurements. The list $E_2$ of cells is provided to the communications terminal, which is asked to perform the radio measurements (block 240). The communications terminal performs the radio measurements and communicates the results to the network.

Those cells in the list $E_2$ that, based on the radio measurements reported to the network by the communications terminal, satisfy predetermined quality prerequisites $Q_{min}$, for example whose signal is received with sufficient strength by the terminal, are then identified (block 245).

If the list $E_2$ of cells is void, or, based on the measurements reported by the communication terminal, none of the cells in the list $E_2$ satisfy predetermined quality prerequisites $Q_{min}$, (block 250, exit branch Y), the service request is assigned to the 3G network (block 215).

Otherwise (exit branch N of block 250), a cell in the list $E_2$ is selected for the service request redirection. The selection of the cell may be made in several different ways. For example, the cell may be selected randomly, so as to attempt equally distributing the traffic among the 2G cells; alternatively, the cell in the list $E_2$ having the best measured radio quality may be selected; as a further alternative, the first cell in the list $E_2$ may be selected. Other selection criteria are possible.

It pointed out that, in alternative embodiments of the invention, the possibility of performing radio measurements to identify a 2G cell to which redirecting the service request may not be provided for.

The radio controller then attempts redirecting the service request onto the selected 2G cell (block 255).

The service request redirection attempt may succeed or fail, depending on several factors.

A cause of failure may for example be due to the fact that the communications terminal cannot receive the signal of the target cell with a sufficient radio quality (for example, this may occur in case the selection of the target cell is made without measuring the radio signals of the cells, or because the radio quality experienced a worsening compared to the instant when the radio measurements were performed).

The service request redirection attempt may also fail because the target system may refuse the service request redirection from the source system. For example, a maximum load threshold $L^{2G}{}_{MAX}$ may be set for the 2G cell (either common for all the 2G cells, or variable on a cell basis), so that if the current load of the 2G cell selected for the service request redirection is below the maximum threshold $L^{2G}{}_{MAX}$, the service request redirection is accepted, otherwise it is refused. Assuming for example that the load values 0 and 1 correspond to a 2G cell that is unloaded and, respectively, in saturation, the choice of the threshold $L^{2G}{}_{MAX}$ may be made following several different criteria, such as for example:

- $L^{2G}{}_{MAX}=1$, so that the cell can accept service requests up to its saturation;
- $L^{2G}{}_{MAX}$ equal to a predetermined value, equal to the ratio of an estimated number of single-mode terminals (or dual-mode terminals out of the coverage of the 3G network) and the overall number of terminals; in this way, part of the radio resources of the 2G cell are reserved to single-mode terminals (or to GSM-only terminals) that necessarily need to use the 2G network;
- $L^{2G}{}_{MAX}$ defined dynamically, based on counters adapted to dynamically estimate how many terminals cannot use the 3G network (i.e. single-mode GSM-only terminals or dual-mode terminals which are out of the coverage of the 3G network).

If the service request redirection attempt fails (exit branch N of block 260), the 2G cell that refused the service request redirection is put in a suspended state (block 265), so that next time a service request redirection is attempted, that 2G cell is not taken into consideration (it is not included in the list $E_1$) until that 2G cell remains in suspended state.

Preferably, the suspension is set for a limited time $T_c$, so that when the time $T_c$ expires the cell is removed from the suspended state and can be again taken into account as a candidate for a service request redirection.

The time $T_c$ may be specified in the CRRM algorithm configuration phase, either common for all the cells or variable on a cell by cell basis. Optionally, the time $T_c$ may not be a fixed amount of time, being instead possible to update it based on the result of the service request redirection attempts that involve the considered cell.

For example, the time $T_c$ may be increased each time the considered cell refuses a service request redirection, possibly up to a maximum time value $T_{MAX}$. An updated time value $T'_c$ may be calculated for instance based on the following formula:

$$T'_C = \frac{T_C + T_{MAX}}{2}$$

For example, if, starting from a time $T_c$ of 1 min, and assuming a maximum time $T_{MAX}$ of 9 min, the first time the considered cell refuses a service request redirection, the cell is suspended for 1 min. If, after the lapse of 1 min, a new service request redirection attempt to that cell fails, the cell is suspended for a time $T'_c$ equal to $(1+9)/2=5$ min. If, after the lapse of 5 min, a new service request redirection attempt fails, the cell is suspended for a time $T'_c$ equal to $(5+9)/2=7$ min, and so on.

If the redirection attempt fails (exit branch N of block 260), it is checked if other redirection attempts for that service request can be made. If so (block 280, exit branch N) the 2G cell is removed from list $E_2$ (block 285) and steps from block 250 are performed again. A counter keeps track of the number of redirection attempts for that service request. If a maximum number of redirection attempts $N_{MAX\_attempts}$ for that service request has been reached (block 280, exit branch Y), the service request is assigned to the 3G network (block 215). The parameter $N_{MAX\_attempts}$ may be specified in the CRRM algorithm configuration phase, either directly or, for example, on the basis of a maximum time reserved for the re-direction attempts.

If the service request redirection attempt succeeds (exit branch Y of block 260), the service request is redirected and assigned to the selected 2G cell (block 270). Optionally, the value of the time $T_c$ for that cell may be updated (block 275) each time a service request redirection to that cell succeeds, for example the time $T_c$ may be decreased, possibly down to a minimum value $T_{MIN}$. The updated value $T'_c$ of the time $T_c$ may for example be calculated using the following formula:

$$T'_C = \frac{T_C + T_{MIN}}{2}$$

Assuming by way of example that $T_{MIN}$ is equal to 1 min, if, after the considered cell has been suspended for 7 min, a new service request redirection attempt succeeds, the value of the time $T_c$ is updated to (7+1)/2=4 min.

The initial value $T_{def}$ of the time $T_c$ for every cell (or for all the cells) may be set by the network manager, possibly depending on the minimum and maximum values $T_{MIN}$ and $T_{MAX}$.

Figure 3:
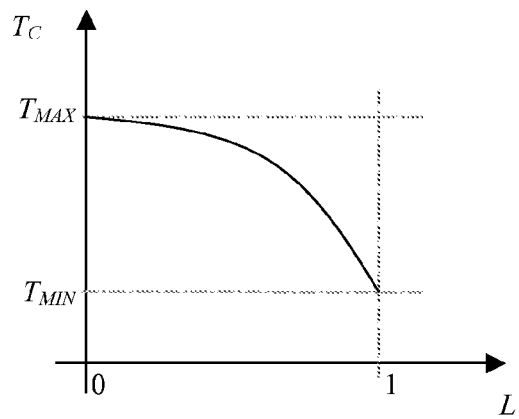
FIG. 3 is a diagram showing a possible dependence of a cell suspension time on the load status of the source cell (i.e., a cell of the source system)

Other criteria may be adopted for assigning the suspension time to the cells. For example, possible criteria may be:

fixed time $T_c$ (equal to $T_{def}$) assigned to all the cells, or on a cell-by-cell basis, during the CRRM algorithm configuration phase;

dynamically variable time $T_c$ based on the load status of the 3G cell (the source cell), for example according to the diagram reported in FIG. 3 (where L in abscissa denotes the load of the 3G cell: the higher is this load, the lower is the time $T_c$ in order to increase the probability of finding at least one 2G cell which is not suspended when a new service is requested).

The update of the suspension time value may concern only the 2G cell that refused/accepted the service request redirection, or all the 2G cells (included in the list $E_0$), or the already suspended cells (the cells' suspension time value may be changed taking into account both the residual suspension time of the 2G cell and the load condition of the 3G cell).

The decision of whether to accept or refuse the service request redirection based on a load status threshold of the 2G cell (target cell) may have an impact on the implementation aspects of the CRRM algorithms.

Figure 4:
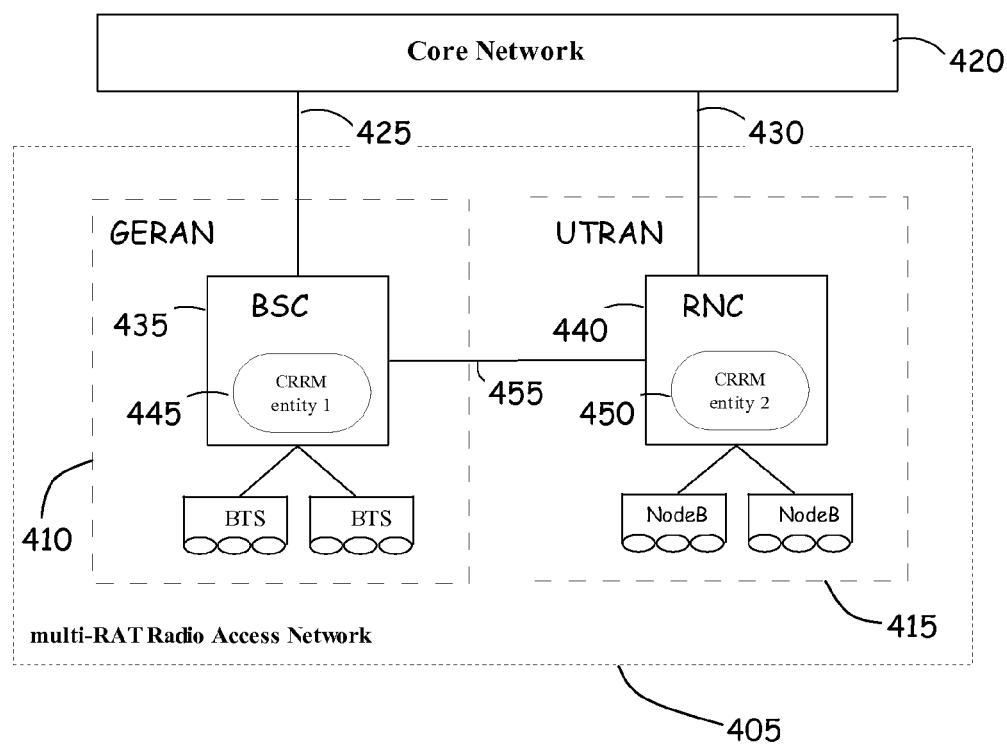
FIGS. 4 to 6 are examples of network architectures where the present invention can be implemented.
Figure 5:
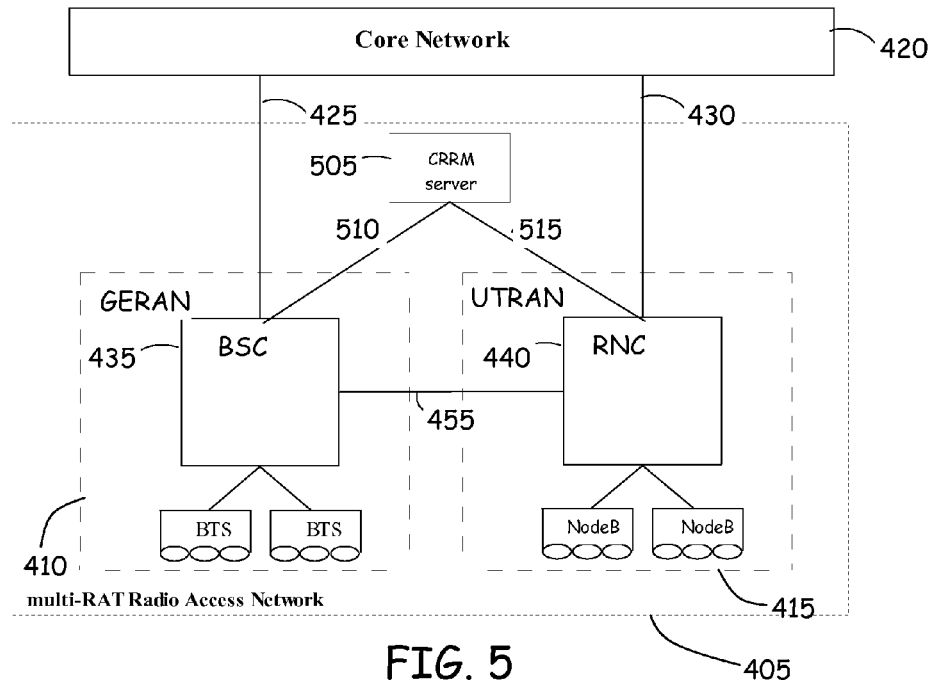

For example, in case the criterion for accepting or refusing a service request redirection is based on the load threshold of the selected candidate 2G cell, the CRRM algorithm should be implemented as schematically shown in FIG. 4 or 5. In these figures, the dashed line rectangle denoted with reference numeral 405 schematically represents the multi-RAT radio access network, which, in the exemplary scenario herein considered is comprised of a GERAN and a UTRAN. Reference numeral 410 denotes the GERAN, whereas reference numeral 415 denotes the UTRAN. Reference numeral 420 designates the core network, that is interconnected with the GERAN 410, via an interface 425, and with the UTRAN 415, via an interface 430. The network device or apparatus controlling the radio resources of the GSM system, namely the BSC (Base Station Controller) 435, and the equivalent network device or apparatus controlling the radio resources in the UMTS network, namely the RNC (Radio Network Controller) 440, include respective CRRM entities 445 and 450, which are configured to implement the CRRM algorithm described in the foregoing and are configured to exchange information via the core network 420. Alternatively, an interface 455 may be provided to permit direct communication between the BSC 435 and the RNC 440. Alternatively, as depicted in FIG. 5, the CRRM algorithm is executed by a host network device 505, acting as a CRRM server. The CRRM server 505 requests information on the GSM cells to the BSC 435 via an interface 510, and on the UMTS cells to the RNC 440 via an interface 515.

Figure 6:
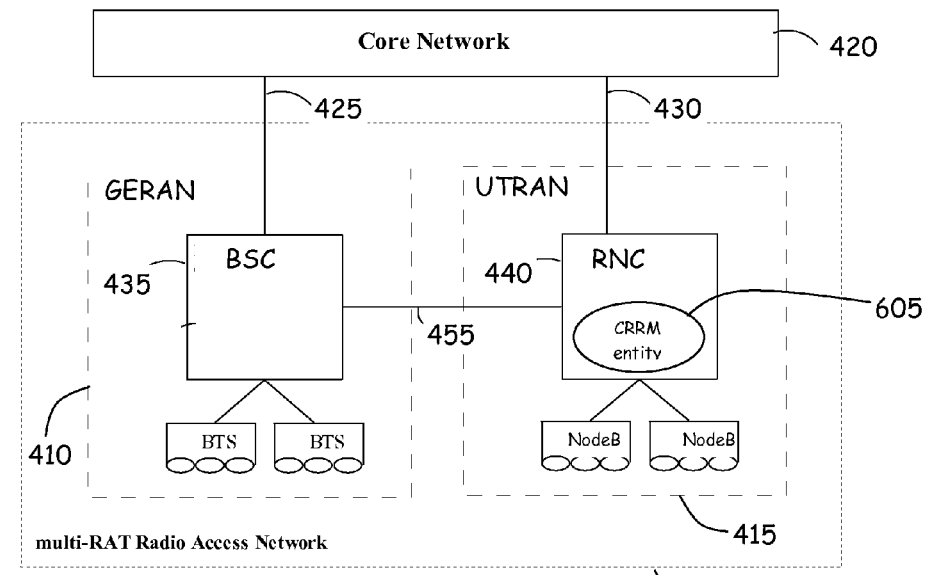

In FIG. 6 there is schematically depicted a still alternative implementation of the present invention, in which only the source system includes a CRRM entity 605.

The exemplary CRRM algorithm described in the foregoing is preferably designed to enable the network manager (for example through a suitable operation and maintenance interface) great configuration capabilities of input parameters to the algorithm, for an increased flexibility. For example, a list of configurable input parameters (specific for each 3G cell, and possibly assignable to groups of 3G cells) is the following:

| Symbol | Description | Notes |
|---|---|---|
| $E_0$ | Ordered list of 2G cells in overlay with the considered 3G cell | This list should be defined for each 3G cell |
| $T_{def}$ | Default suspension time value for the 2G cells ($0 \leq T_{def}$) | |
| $T_{MIN}$ | Minimum suspension time value for 2G cells ($0 \leq T_{MIN} \leq T_{def}$) | Optional (present only if a dynamic update of the suspension time value is adopted) |
| $T_{MAX}$ | Maximum suspension time value for 2G cells ($T_{MIN} \leq T_{def} \leq T_{MAX}$) | Optional (present only if a dynamic update of the suspension time value is adopted) |
| N | Maximum number of 2G cells on which to perform radio measurements ($N \geq 1$) | Optional (present only if radio quality measurements of 2G cells is implemented) |
| $N_{MAX\_attempts}$ | Maximum number of attempts for redirecting the service request | |
| $Q_{min}$ | Minimum acceptable radio quality for 2G cells | Optional (present only if radio quality measurements of 2G cells is implemented) |
| $L^{3G}_{LOW}$ | 3G cell load below which no service request redirection is attempted ($0 \leq L^{3G}_{LOW} \leq 1$) | Optional (present only if it is desired to base the decision on whether to attempt redirection on the load of 3G cells) |
| $L^{2G}_{MAX}$ | Maximum load of the 2G cell for accepting service request redirections ($0 \leq L^{2G}_{MAX} \leq 1$) | Optional (present only if it is desired to condition the acceptance/refusal of a service request redirection on a load threshold of the 2G cell) |
| | Request to perform radio measurements on 2G cells (Yes/No) | Optional (present only if it is desired to have the possibility of enabling/disabling the radio measurements) |
| X | Percentage of service requests to be subjected to service request redirection | Optional (present only if it is desired to limit the number of service requests to subject to redirection) |

Those skilled in the art may appreciate that the solution according to the present invention may be implemented in several different kinds of heterogeneous networks, taking into account the prescriptions of the relevant standards.

In the following, some exemplary considerations are given that may be taken into account for implementing the CRRM algorithm according to the present invention. Other approaches are however possible.

Current standards contemplate the possibility that all the communications terminals that are not at a certain time involved in a network service (terminals in idle mode) camp to a specific system; this is achieved by acting on several different network parameters that are involved in the initial cell selection and cell reselection procedures, or through parameters defining different levels of priority among the cells belonging to different RATs or to different hierarchical levels (in a hierarchical cell structure).

Also, current standards contemplate the possibility of monitoring the load status of the network cells. For UTRAN cells this may for example be performed by monitoring the uplink interference level (a quantity designated as Received Total Wideband Power—RTWP) in conjunction with the instantaneous level of power transmitted in downlink by the NodeB and with the number of channelization codes (Orthogonal Variable Spreading Factor codes—OVSF codes) used in downlink. For the GERAN cells, the load status may for example be determined based on the number of currently used time-slots of each active carrier over the total number of available time-slots of all the active carriers, possibly in conjunction with additional parameters like the usage of the Half-Rate transmission mode.

Furthermore, current standards contemplate the possibility of configuring the communications terminals in such a way that they report to the network the results of radio quality measurements made on different cells, for example by inter-RAT or inter-frequency radio measurements.

Additionally, in current standards the radio controllers (like the RNCs or the BSCs) can implement specific algorithms devoted to control the network procedures for improving the network resources management.

Finally, current standards contemplate the possibility of redirecting requests related to a specific service towards a different cell, by service-based inter-RAT or inter-frequency directed-retry or handover procedures.

Figure 7:
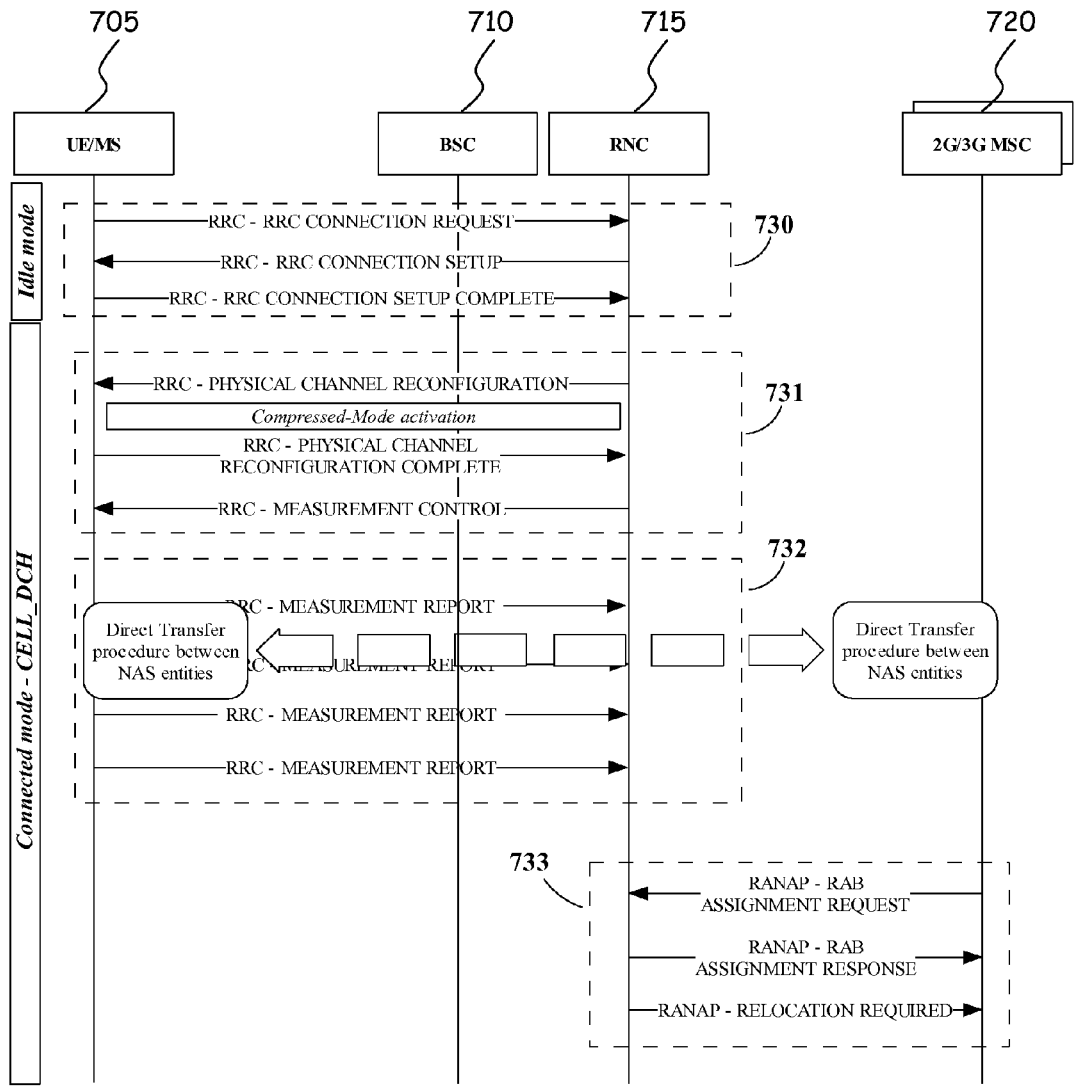
FIG. 7 shows an example of signalling flow involved in an implementation of the present invention in a heterogeneous network comprising a GSM and a UMTS network.

Reference is made to FIG. 7, showing the functionalities foreseen in the 3GPP standard (further details can be found in 3GPP TS 23.009 "Handover procedures", 3GPP TS 25.331 "Radio Resource Control; Protocol Specification", 3GPP TS 25.413 "UTRAN Iu interface RANAP signalling" of Release 99 and higher) that can be exploited for implementing the method according to an embodiment of the present invention for the redirection of a voice call from the 3G system to the 2G system. In the drawing, reference numeral. 705 denotes a communications terminal (a User Equipment—UE—or a Mobile Station—MS); 710 and 715 denote the radio controllers of the GERAN and the UTRAN, respectively; reference numeral 720 denotes a Mobile Switching Center (MSC) of the core network. Reference numeral 730 denotes the signalling messages exchanged between the UE and the RNC in order to perform the service request by activating the so-called RRC connection (i.e. RRC CONNECTION REQUEST message, RRC CONNECTION SETUP message and RRC CONNECTION SETUP COMPLETE message). Reference numeral 731 denotes the signalling messages exchanged between the UE and the RNC in order to activate the radio measurements on the GERAN cells during the call set up (i.e. to let the UE activate the so-called Compressed Mode and to configure radio measurements on the UE). Reference numeral 732 depicts the measurement results reported by the UE to the RNC by the so-called RRC MEASUREMENT REPORT messages during the signalling flow devoted to set up the call. Finally, numeral 733 denotes the signalling messages exchanged between the RNC and the MSC (Mobile Switching Center) to accomplish the call redirection towards the GSM system by the RAB ASSIGNMENT REQUEST, RAB ASSIGNMENT RESPONSE and RANAP RELOCTION REQUIRED messages.

In the exemplary scenario considered in the foregoing it can be envisaged that all dual-mode (GSM/UMTS) communications terminals located in areas covered by both the GSM and the UMTS networks rely on the UMTS system in a service request phase.

It can then be envisaged that dual-mode terminals that requested a voice service to a UMTS cell are able to make radio quality measurements on some GSM cells before the service starts being furnished, by enabling the compressed-mode transmission after the RRC connection has been activated, when the network configures the terminals for making such inter-RAT measurements on the GSM cells.

Finally, if the decision logic of the algorithm so provides, the voice service can be redirected to the identified GSM cell, through the directed retry procedure.

The method according to the present invention can be performed by the radio controllers of the RANs (for example, the BSCs and/or the RNCs), or in a specific or dedicated network node, or in a separate network entity, in a totally transparent way. For example, considering the E-UTRAN system or the HSPA Evolution system, the method can be performed directly by the evolved-NodeB (eNodeB). The method may as well be performed by a network node external to the radio access network, for example by a core network node or an operation and maintenance node. In general, the implementation present invention does not need any peculiar network architecture.

Although in the preceding description reference has been made to a heterogeneous network comprising a GSM system and a UMTS system, the present invention can be readily extended to situations wherein more than two RATs coexist, or to the management of different groups of cells within the same RAT. Also, despite in the preceding description only the redirection of a voice-call related service has been considered, the present invention applies in general to any (combination of) network service(s).

Just to mention other examples, not to be construed limitatively, the present invention may be applied in a network context featuring three different RANs, e.g. GSM, UMTS and E-UTRAN, or in a UMTS network formed by two distinct pools of cells, using different UTRAN carriers (different frequency layers). In this latter scenario, it may be desirable that all the terminals send their service requests to cells using a first frequency layer, and then to redirect requests for activation of data connections to the overlapped cells using the second frequency layer, which may for example have the capability of serving users requesting data connections by exploiting the HSDPA (High Speed Downlink Packet Access) technology; in this way, the proposed solution may achieve a distribution of the traffic such that voice traffic (and possibly other services) are offered through a first UTRAN carrier, while HSDPA data connections are offered by exploiting the other UTRAN carrier.

Another situation in which the present invention can be applied is that of a network with a Hierarchical Cells Structure (HCS), with cells possibly belonging to the same RAT, using for example same frequencies, but belonging to different hierarchies (e.g. macro-versus micro-versus pico-cells).

The invention is also applicable in situations including various combinations of the scenarios mentioned above, e.g. by foreseeing to redirect users' requests for a first kind of service towards a first set of resources and also to redirect requests for a second kind of service towards a second set of resources, and so on.

The present invention is not necessarily limited to the application in mobile telecommunications systems, being in general applicable whenever the possibility exists of serving incoming service requests through two or more kinds of communication resources. For example, the invention may be applied in fixed (wired) communication networks.

The method of the present invention may be implemented in the form of one or more algorithms, written in any suitable programming language, and executable by data and/or signal processors embedded in network apparatuses.

The invention claimed is:

1. A method of providing services in a telecommunications network comprising:
receiving, from a user terminal, a service request to access a first communication resource included in the telecommunications network;
prior to providing a service corresponding to the service request, generating a list comprising a plurality of candidate communication resources to attempt to redirect the service request to, wherein the list includes a second communication resource;
determining whether a number of previous failed attempts to redirect service requests to a third communication resource exceeds a threshold;
in response to determining that the number of previous failed attempts to redirect service requests to the third communication resource exceeds the threshold:
determining a time interval to exclude the third communication resource from the list based on successes and failures of previous attempts to redirect service requests to the third communication resource; and
excluding the third communication resource from the list for the determined time interval;
determining whether one or more criterion for the second communication resource of the plurality of candidate communication resources is satisfied, wherein the one or more criterion comprises a history criterion that takes into account outcomes of past redirection attempts to the second communication resource; and
if the one or more criterion for the second communication resource is satisfied, redirecting the service request to the second communication resource and providing the service corresponding to the service request to the user terminal using said second communication resource.

2. The method of claim 1, wherein said one or more criterion further comprises one or more of the following criteria:
a type of the requested service,
a load status of the first communication resource, and
a number of previous service requests for the first communication resource exceeding a predefined number.

3. The method of claim 1, further comprising:
decreasing said time interval if a redirection attempt to the third communication resource succeeds; and
increasing said time interval if a redirection attempt to the third communication resource fails.

4. The method of claim 3, further comprising determining a minimum time interval value and a maximum time interval value, wherein:
decreasing said time interval comprises setting said time interval to the minimum time interval value if said time interval would be decreased below the minimum time interval value, and
increasing said time interval comprises setting said time interval to the maximum time interval value if said time interval would be increased above the maximum time interval value.

5. The method of claim 1, further comprising:
receiving, from the second communication resource, a message indicating acceptance or refusal of the redirection attempt, wherein the acceptance or refusal is based on a current load status of the second communication resource.

6. The method of claim 1, wherein said first communication resource and said second communication resource comprise one or more of the following:
radio resources belonging to different radio access technologies,
radio resources using different radio frequencies,
cells of cellular networks belonging to different hierarchical levels,
radio resources having a different radio resources control management,
radio resources corresponding to different and at least partially overlapped radio coverage areas obtainable by different beams of the same antenna or different antennas, and
different logical transport links.

7. The method of claim 6, wherein said first communication resource comprises a first cell of a cellular network and said second communication resource comprises a second cell of the cellular network, and said generating the list comprising the plurality of candidate communication resources comprises determining that the second cell overlaps with the first cell.

8. The method of claim 1, wherein said second communication resource comprises radio communication resources, and wherein the method further comprises:
performing measurements on a radio quality of the radio communication resources.

9. The method of claim 1, further comprising:
ordering the list based on an amount of overlap of each of the plurality of candidate communication resources with the first communication resource.

10. The method of claim 9, wherein the first communication resource comprises a cell of a cellular network belonging to a first hierarchical level, and wherein each of the plurality of candidate communication resources comprises a cell of the cellular network belonging to a hierarchical level lower than the first hierarchical level.

11. The method of claim 1, wherein redirecting the service request to the second communication resource and providing the service corresponding to the service request to the user terminal using said second communication resource are performed before providing the service using said first communication resource.

12. A non-transitory computer readable medium having computer readable instructions stored thereon that, when executed by at least one computer, perform the method steps of claim 1.

13. A communications resources controller for a telecommunications network, the communications resources controller comprising:

a computing device; and one or more computer readable media having computer readable instructions stored thereon that, when executed by the computing device, cause the communications resources controller to:

receive, from a user terminal, a service request to access a first communication resource included in the telecommunications network;

prior to providing a service corresponding to the service request, generate a list comprising a plurality of candidate communication resources to attempt to redirect the service request to, wherein the list includes a second communication resource;

determine whether a number of previous failed attempts to redirect service requests to a third communication resource exceeds a threshold;

in response to determining that the number of previous failed attempts to redirect service requests to the third communication resource exceeds the threshold:

determine a time interval to exclude the third communication resource from the list based on successes and failures of previous attempts to redirect service requests to the third communication resource; and exclude the third communication resource from the list for the determined time interval;

determine whether one or more criterion for the second communication resource of the plurality of candidate communication resources is satisfied, wherein the one or more criterion comprises a history criterion that takes into account outcomes of past redirection attempts to the second communication resource; and if the one or more criterion for the second communication resource is satisfied, redirect the service request to the second communication resource and provide the service corresponding to the service request to the user terminal using said second communication resource.

14. A telecommunications network including at least a first communication resource and a second communication resource and adapted to provide services to user terminals, the telecommunications network comprising a communications resources controller according to claim 13.

15. The communications resources controller of claim 13, wherein redirecting the service request to the second communication resource and providing the service corresponding to the service request to the user terminal using said second communication resource are performed before providing the service using said first communication resource.

16. The communications resources controller of claim 13, wherein the one or more computer readable media has computer readable instructions stored thereon that, when executed by the computing device, cause the communications resources controller to:

decrease said time interval if a redirection attempt to the third communication resource succeeds; and increase said time interval if a redirection attempt to the third communication resource fails.

17. The communications resources controller of claim 13, wherein the one or more computer readable media has computer readable instructions stored thereon that, when executed by the computing device, cause the communications resources controller to:

receive, from the second communication resource, a message indicating acceptance or refusal of the redirection attempt, wherein the acceptance or refusal is based on a current load status of the second communication resource.

18. The communications resources controller of claim 13, wherein said first communication resource and said second communication resource comprise one or more of the following:

radio resources belonging to different radio access technologies, radio resources using different radio frequencies, cells of cellular networks belonging to different hierarchical levels, radio resources having a different radio resources control management, radio resources corresponding to different and at least partially overlapped radio coverage areas obtainable by different beams of the same antenna or different antennas, and different logical transport links.

19. The communications resources controller of claim 18, wherein said first communication resource comprises a first cell of a cellular network and said second communication resource comprises a second cell of the cellular network, and said generating the list comprising the plurality of candidate communication resources comprises determining that the second cell overlaps with the first cell.

20. The communications resources controller of claim 13, wherein said second communication resource comprises radio communication resources, and wherein the one or more computer readable media has computer readable instructions stored thereon that, when executed by the computing device, cause the communications resources controller to:

perform measurements on a radio quality of the radio communication resources.

* * * * *